United States Patent [19]

Inoue

[11] Patent Number: 5,404,351
[45] Date of Patent: Apr. 4, 1995

[54] DATA TRANSMISSION UNIT HAVING A PLURALITY OF PORTS

[75] Inventor: Masayoshi Inoue, Kawasaki, Japan

[73] Assignee: Fujitsu Ltd., Japan

[21] Appl. No.: 210,721

[22] Filed: Mar. 18, 1994

Related U.S. Application Data

[63] Continuation of Ser. No. 782,387, Oct. 25, 1991, abandoned.

[30] Foreign Application Priority Data

Oct. 29, 1990 [JP] Japan .................................. 2-291078

[51] Int. Cl.6 .............................................. H04L 5/00
[52] U.S. Cl. ....................................... 370/24; 370/31; 375/222
[58] Field of Search ................ 370/24, 31; 375/8, 36; 379/177, 184, 209

[56] References Cited

U.S. PATENT DOCUMENTS

| | | |
|---|---|---|
| 4,219,700 | 8/1980 | Panizzon et al. ................... 379/184 |
| 4,578,796 | 3/1986 | Charalambous et al. ............... 375/8 |
| 4,718,082 | 1/1988 | Parker et al. ......................... 379/98 |
| 4,893,305 | 1/1990 | Fernandez et al. ................. 370/31 X |
| 4,924,492 | 5/1990 | Gitlin et al. ........................ 370/24 X |

FOREIGN PATENT DOCUMENTS

| | | | |
|---|---|---|---|
| 142302 | 10/1984 | European Pat. Off. | .... H04M 11/06 |
| 40021 | 3/1979 | Japan | ............................... H04J 3/06 |
| 140238 | 6/1986 | Japan | ............................... H04J 3/00 |
| 1149666 | 6/1989 | Japan | .......................... H04M 11/06 |
| 2187609 | 12/1986 | United Kingdom | ........ H04M 11/06 |

Primary Examiner—Douglas W. Olms
Assistant Examiner—Russell W. Blum
Attorney, Agent, or Firm—Greer, Burns & Crain, Ltd.

[57] ABSTRACT

A data transmission unit includes a plurality of ports respectively connected to one of a plurality of terminals, a data transmission controller which is connected to a line and controls a data transmission, and a control part which is coupled between the data transmission controller and the ports and exchanges data between one of the ports and the data transmission controller in response to a call out command which is received from one of the terminals via the one of the ports.

11 Claims, 9 Drawing Sheets

FIG. 10

| | | |
|---|---|---|
| FULL DUPLEX 2400 bps | SYNC | ASYNC |
| FULL DUPLEX 1200 bps | SYNC | ASYNC |
| HALF DUPLEX 4800 bps | SYNC | |
| HALF DUPLEX 2400 bps | SYNC | |

900

A   B   A & B 900A   900B   900C

DATA TRANSMISSION UNIT HAVING A PLURALITY OF PORTS

This is a continuation of application Ser. No. 07/782,387, filed on Oct. 25, 1991, now abandoned

BACKGROUND OF THE INVENTION

The present invention generally relates to data transmission units, and more particularly to a data transmission unit which enables the use of one line by a plurality of terminals.

In a data transmission using a switched line, it is necessary to use a data transmission unit such as a modem. On the other hand, the switched line may employ the 2-wire half duplex communication system or the 2-wire full duplex communication system. Regardless of which one of these communication systems is employed, there is an increased demand to support a plurality of terminals by a single data transmission unit.

FIG. 1 shows an example of a conventional switched line modem. In FIG. 1, a modem 3 only has one terminal connection port. For this reason, a plurality of terminals, that is, two terminals 2a and 2b in this case, cannot be connected directly to the modem 3. In this example, a switch 4 is coupled between the modem 3 and the terminals 2a and 2b. This switch 4 is used to switch the modem interface manually.

On the other hand, the transmission modes employed by the plurality of terminals may be different. In this case, each terminal must be coupled to an independent modem as shown in FIG. 2. In FIG. 2, the terminal 2a is coupled to the switch 4 via a modem 3a, while the terminal 2b is coupled to the switch via a modem 3b which employs a transmission mode different from that employed by the modem 3a.

However, according to the conventional switched line modem shown in FIG. 1, there are the following problems. First, the switch 4 must be switched manually and it is troublesome to carry out such a manual switching. Second, if the modem 3 has a plurality of transmission modes such as the 2-wire full duplex and 2-wire half duplex communication modes, it is necessary not only to switch the modem interface but also recognize the set transmission mode of the modem 3 so that the modem setting may be changed to the appropriate transmission mode if necessary.

On the other hand, there are the following problems according to the conventional switched line modem shown in FIG. 2. First, the switch 4 must be switched manually and it is troublesome to carry out such a manual switching. Second, it is necessary to provide two modems 3a and 3b. In other words, it is necessary to provide a number of modems corresponding to the number of terminals, and the construction of the switched line modem becomes complex.

SUMMARY OF THE INVENTION

Accordingly, it is a general object of the present invention to provide a novel and useful data transmission unit in which the problems described above are eliminated.

Another and more specific object of the present invention is to provide a data transmission unit comprising a plurality of ports, where each of the ports is connected to one of a plurality of terminals, data transmission controller means, connected to a line, for controlling a data transmission, and control means, coupled between the data transmission controller and the ports, for exchanging data between one of the ports and the data transmission controller means in response to a call out command which is received from one of the terminals via the one of the ports. According to the data transmission unit of the present invention, it is possible to use a single data transmission controller means in common by a plurality of terminals, and the transmission mode of the data transmission controller means can be set automatically even if the data transmission controller means has a plurality of transmission modes, without the need for a manual switching operation.

Other objects and further features of the present invention will be apparent from the following detailed description when read in conjunction with the accompanying drawings.

BRIEF DESCRIPTION OF THE DRAWINGS

FIG. 10 is a plan view showing an essential part of an operation panel shown in FIG. 9.

DESCRIPTION OF THE PREFERRED EMBODIMENTS

First, a description will be given of an operating principle of the present invention, by referring to FIG. 3.

Figure 1:
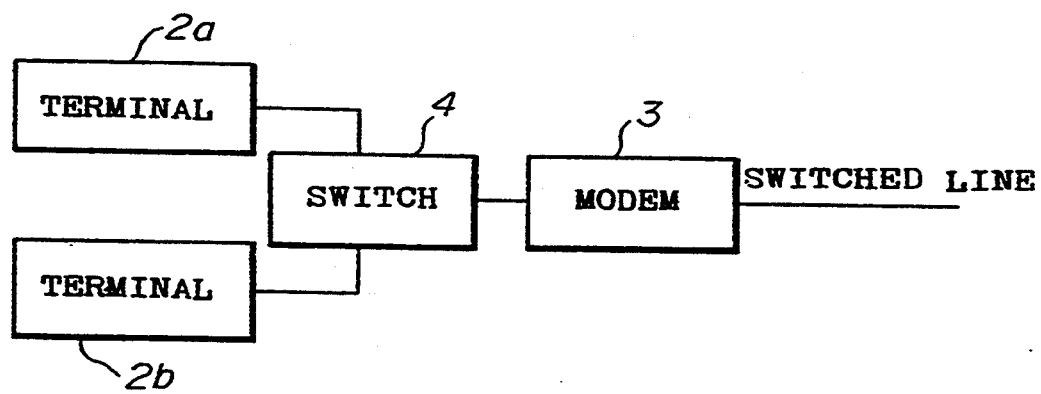
FIG. 1 is a system block diagram showing an example of a conventional switched line modem.
Figure 2:
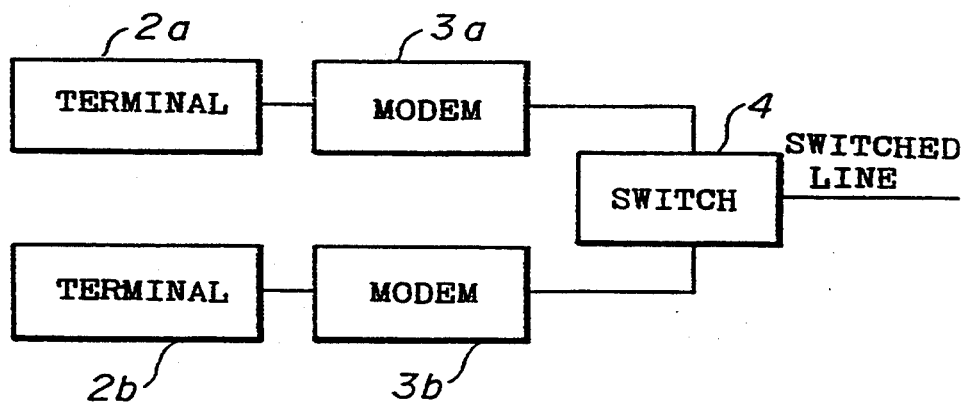
FIG. 2 is a system block diagram showing another example of a conventional switched line modem.
Figure 3:
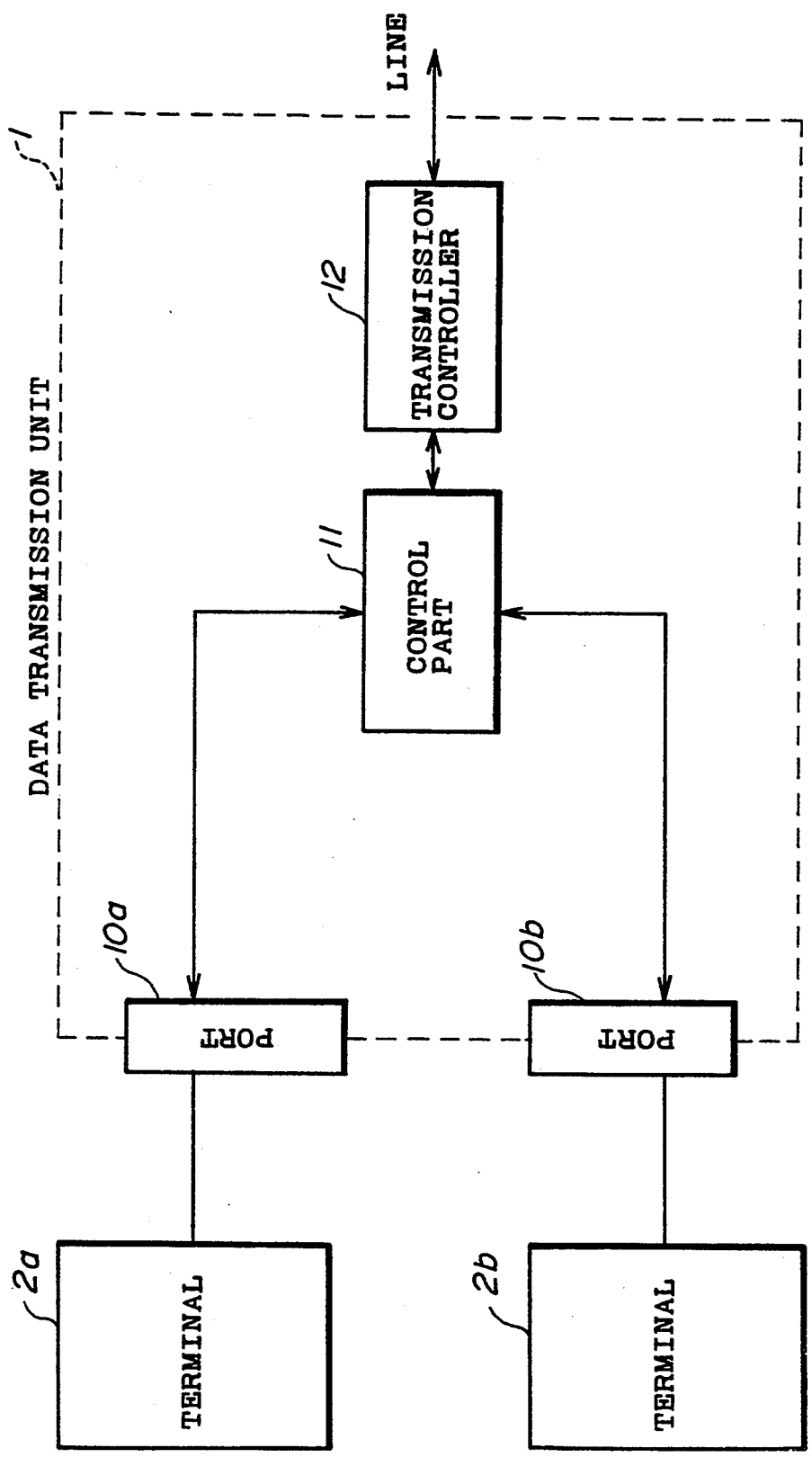
FIG. 3 is a system block diagram for explaining an operating principle of the present invention.

In FIG. 3, a data transmission unit 1 includes a plurality of ports 10a and 10b, a control part 11 and a data transmission controller 12 which are connected as shown. A terminal 2a is coupled to the port 10a, and a terminal 2b is coupled to the port 10b. The data transmission controller 12 is connected to a line. The data transmission controller 12 controls the data transmission. The control part 11 exchanges data between one of the terminals 2a and 2b and the data transmission controller 12 in response to a call command from one of the terminals 2a and 2b.

If the call command is received from the terminal 2a which is coupled to the port 10a but the terminal 2b which is coupled to the other port 10b is using the line, for example, the control part 11 may send a busy answer to the terminal 2a which generated the call command.

According to the present invention, the plurality of ports 10a and 10b are automatically switched by the control part 11 in response to the call command. For this reason, the troublesome manual switching of the modem interface is unnecessary, and the single data transmission controller 12 may be used in common by the plurality of terminals 10a and 10b.

If the call command is received from the terminal 2a in a state where the terminal 2b is using the line and the control part 11 sends the busy answer to the terminal 2a, the terminal 2a receives the busy answer even when the terminal 2a makes an automatic calling. Hence, the terminal 2a will not hang up and may carry out a next process such as a redialing process.

Figure 4:
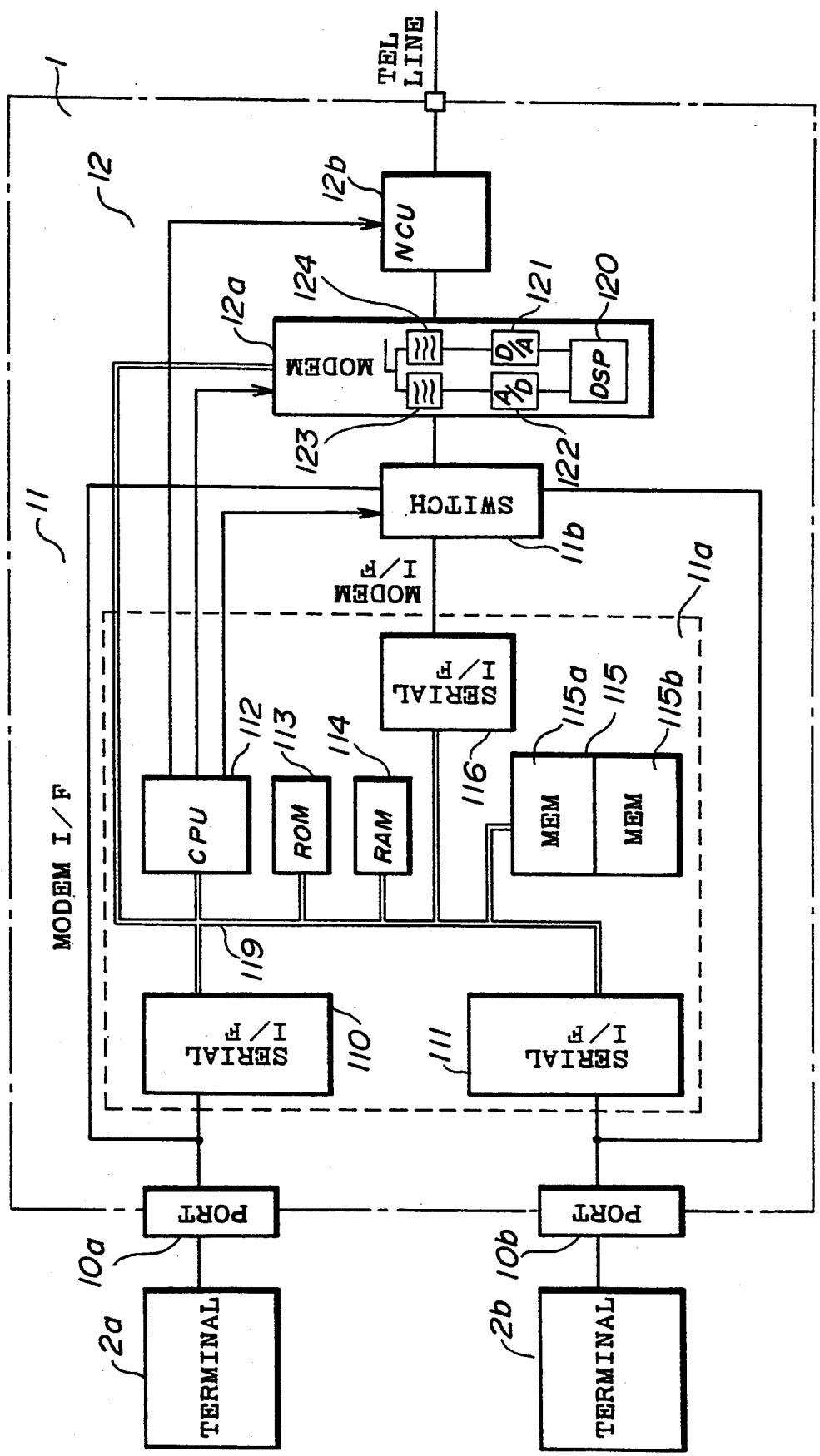
FIG. 4 is a system block diagram showing a first embodiment of a data transmission unit according to the present invention.

Next, a description will be given of a first embodiment of a data transmission unit according to the present invention, by referring to FIG. 4. In FIG. 4, those parts which are the same as those corresponding parts in FIG. 3 are designated by the same reference numerals, and a description thereof will be omitted.

In FIG. 4, the ports 10a and 10b are modem interfaces for respectively coupling to the terminals 2a and 2b. The port 10a is coupled to a serial interface circuit 110 and a switching circuit 11b, and the port 10b is coupled to a serial interface circuit 111 and the switching circuit 11b. A connection controller 11a analyzes commands from the ports 10a and 10b, and controls the switching circuit 11b and the like. The connection controller 11a and the switching circuit 11b form the control part 11.

The connection controller 11a includes the serial interface circuits 110 and 111, a central processing unit (CPU) 112, a read only memory (ROM) 113, a random access memory (RAM) 114, a memory 115 and a serial interface circuit 116 which are coupled via a bus 119. The serial interface circuits 110 and 111 respectively receive the serial data from the ports 10a and 10b and supply the data to the CPU 112 in the form of parallel data. On the other hand, the serial interface circuits 110 and 111 respectively convert parallel data received from the CPU 112 into serial data and supply the serial data to the ports 10a and 10b.

The serial interface circuits 110 and 111 operate independently of each other. Hence, the serial interface circuits 110 and 111 may operate at mutually different transmission speeds and with mutually different data formats. For example, it is possible to operate the port 10a in an asynchronous mode at 2400 dps and operate the port 10b in a synchronous mode at 4800 dps.

The CPU 112 carries out analysis and setting of the commands received from the ports 10a and 10b, and controls the serial interface circuits 110, 111 and 116. In addition, the CPU 112 controls a network control unit (NCU) 12b and controls the switching of the switching circuit 11b. During a data communication, the CPU 112 can also make a data error correction and a data compression.

The ROM 113 stores programs of the CPU 112, tables and the like. The RAM 114 stores various data. The memory 115 is made up of a memory part 115a which is provided with respect to the port 10a and a memory part 115b which is provided with respect to the port 10b. The memory part 115a stores data transfer mode setting information from the terminal 2a, and the memory part 115b stores data transfer mode setting information from the terminal 2b.

The serial interface circuit 116 converts the parallel data from the CPU 112 into serial data, and transmits the serial data to a modem 12a. The serial interface circuit 116 also converts serial data from the modem 12a into parallel data and supplies the parallel data to the CPU 112. In a mode in which the error correction and the data compression are made during the data communication, the serial interface circuit 116 functions as the interface between the CPU 112 and the modem 12a.

The switching circuit 11b switches the interfaces with respect to the modem 12a. The switching circuit 11b couples one of the interfaces of the ports 10a and 10b and the CPU 112 to the modem 12a under the control of the CPU 112.

The modem 12a includes a digital signal processor (DSP) 120 for carrying out the modulation and demodulation digitally, a digital-to-analog (D/A) converter 121 which is used for the transmission, an analog-to-digital (A/D) converter 122 which is used for the reception, and filters 123 and 124 for controlling the band. The modem 12a can operate at any one of a plurality of modes. For example, the plurality of modes may include the CCITT Recommendations V22bis 2-wire full duplex mode at 2400 bps, the V22 2-wire full duplex mode at 1200 bps, the V.27 ter 2-wire half duplex mode at 4800 bps, the V.26bis 2-wire half duplex mode at 2400 bps and the like.

The NCU 12b is connected to a telephone line, and carries out call out operation and a call in operation.

Figure 5:
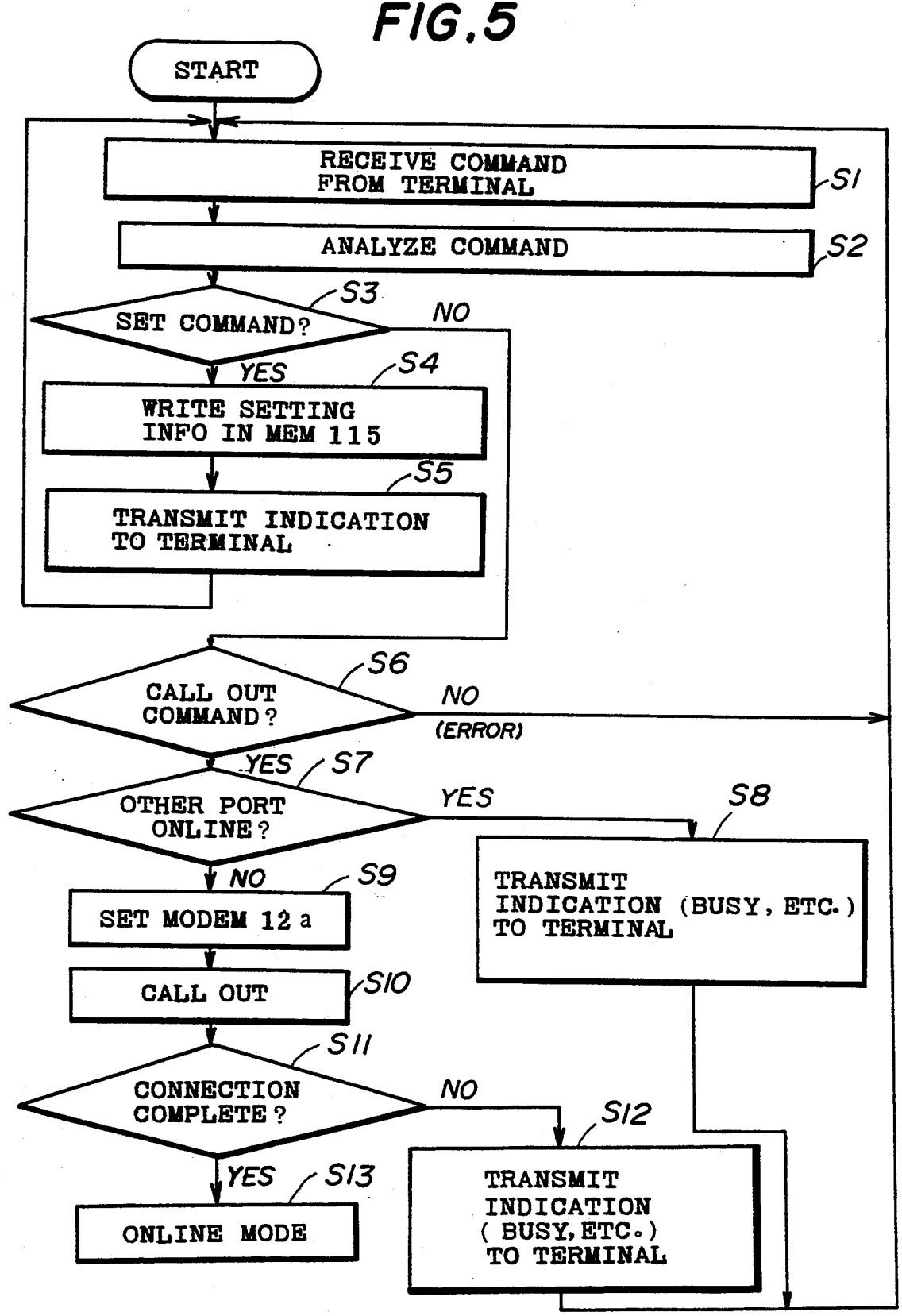
FIG. 5 is a flow chart for explaining an operation of the first embodiment.

Next, a description will be given of the operation of the first embodiment, by referring to the flow chart shown in FIG. 5. FIG. 5 shows the operations of the CPU. 112.

In FIG. 5, the CPU 112 constantly monitors the commands from the terminals 2a and 2b in a step S1, and the received command is analyzed in a step S2. A step S3 decides whether or not the command received from the terminal is a set command which does not operate the modem 12a and the NCU 12b. If the decision result in the step S3 is YES, a step S4 writes the setting information in the memory 115, and a step S5 returns an indication to the terminal to notify the terminal that the setting information has been written. The process returns to the step S1 after the step S5.

Therefore, the ports 10a and 10b may be set independently of each other. In other words, when viewed from the terminals 2a and 2b, the modem 12a can be made to appear as if the modem 12a is provided exclusively for each of the terminals 2a and 2b.

On the other hand, if the decision result in the step S3 is NO, a step S6 decides whether or not the command received from the terminal is a call out command. If the decision result is YES, a step S7 decides whether or not at least one of the modem 12a and the NCU 12b is in use. If at least one of the NCU 12b and the modem 12a is used by the port which is other than the port from which the call out command is received and the decision result in the step S7 is YES, a step S8 returns a busy answer to the port from which the call out command is received so as to notify the terminal that the modem 12a is in use. The process returns to the step S1 after the step S8. For example, the busy answer may be BUSY in the case of the AT command and CFIAB in the case of the CCITT Recommendations V25bis. On the other hand, if the decision result in the step S7 is NO, it is judged that an error has occurred and the process returns to the step S1.

If at least one of the modem 12a and the NCU 12b is in use and the decision result in the step S7 is NO, a step S9 supplies the setting information stored in the memory 115 to the modem 12a via the bus 119, so as to set the mode of the modem 12a. Then, a step S10 instructs the NCU 12b to carry out a call out operation, and a step S11 decides whether or not a connection is completed. If the decision result in the step S11 is NO, a step S12 an indication such as the busy answer is returned to the port from which the call out command was received, and the process returns to the step S1.

On the other hand, if the decision result in the step S11 is YES, a step S13 controls the switching circuit 11b so as to connect the interface of the port from which the call out command was received to the modem 12a and realize an online mode.

In this embodiment, it is also possible to realize a mode in which the CPU 112 carries out the error correction and the data compression during the online mode. If this mode is set, the CPU 112 connects the switching circuit 11b to the serial interface circuit 116. Hence, the data from the port 10a or 10b is processed and transmitted to the modem 12a via the serial interface circuit 116. Such a mode may be set from the terminal by a command or the like.

Since there is only one telephone line, the ports 10a and 10b cannot assume the online mode at the same time.

Next, a description will be given of an application of the first embodiment, by referring to FIG. 6.

Figure 6:
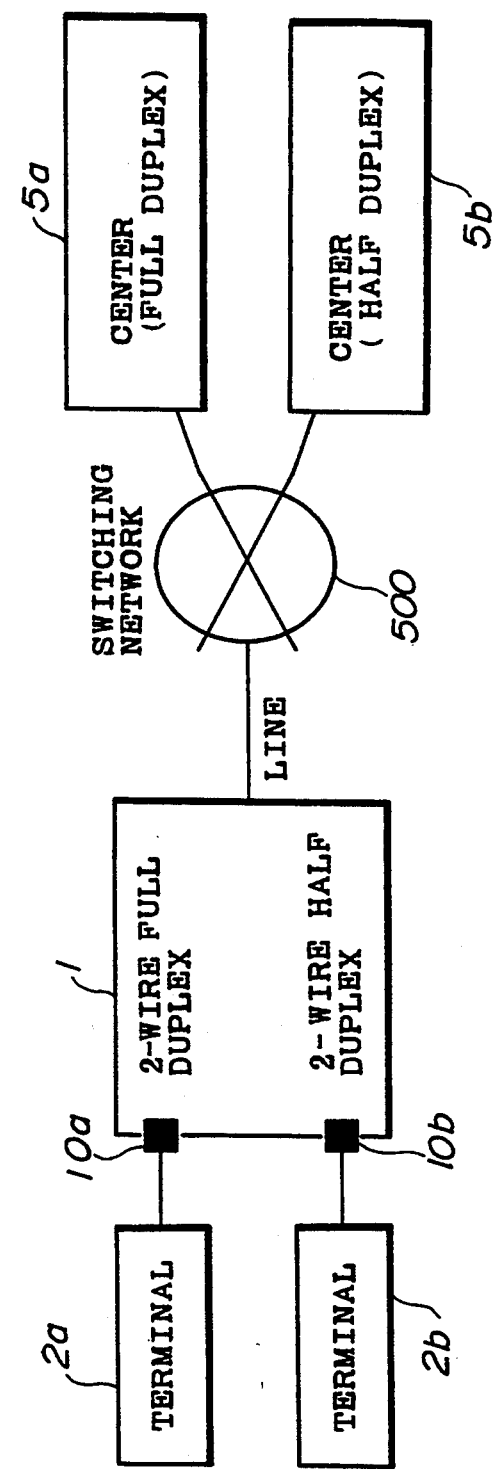
FIG. 6 is a system block diagram for explaining an application of the first embodiment.

In FIG. 6, the single data transmission unit 1 has a 2-wire full duplex mode and a 2-wire half duplex mode. The terminal 2a is connected to the port 10a of the data transmission unit 1, and the terminal 2b is connected to the port 10b of the data transmission unit 1. The data transmission unit 1 is coupled to a full duplex center 5a and a half duplex center 5b via a line which connects to a switching network 500. Accordingly, the terminals 2a and 2b can communicate with either one of the centers 5a and 5b via the data transmission unit 1 and the switching network 500.

Figure 7:
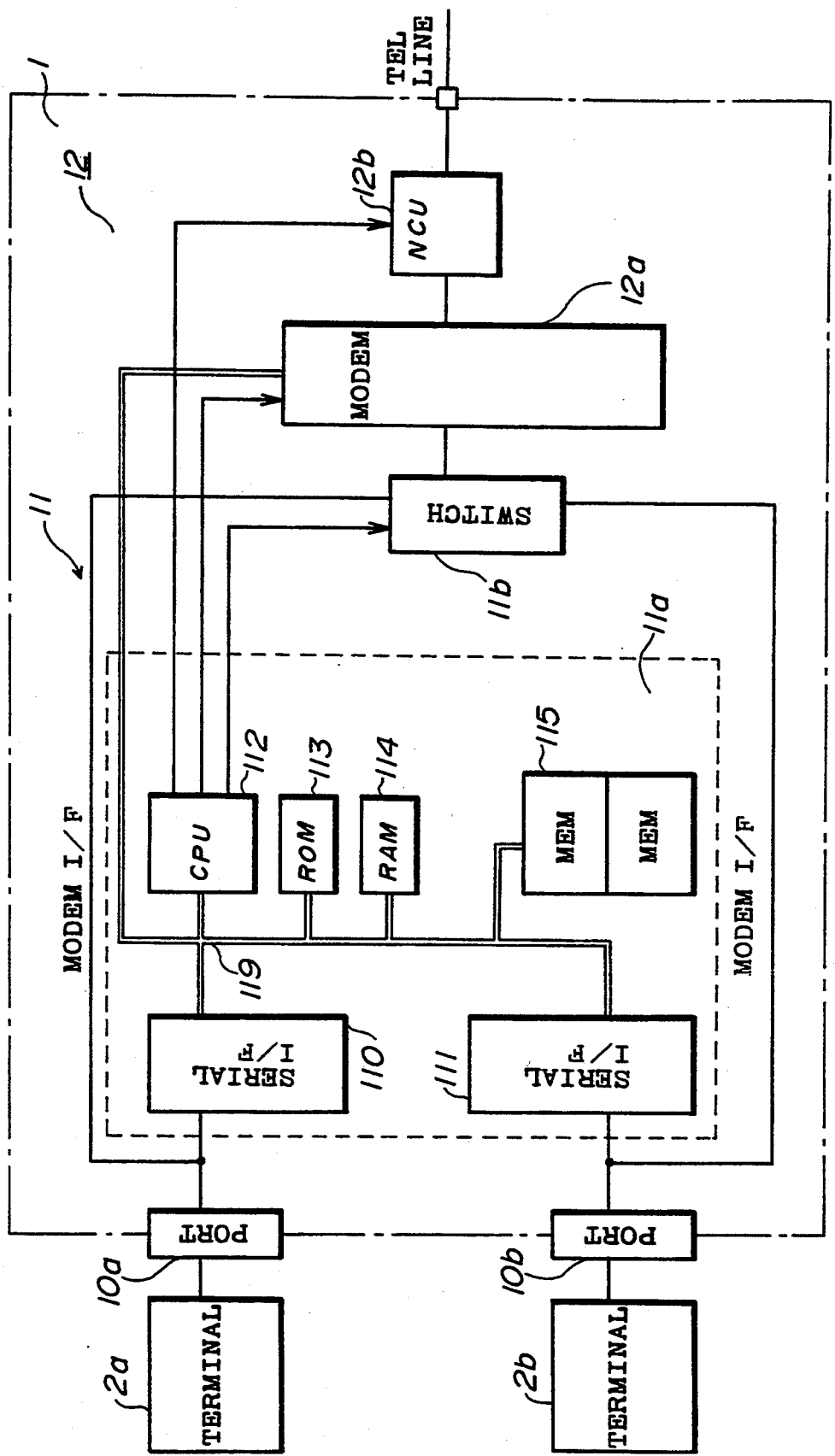
FIG. 7 is a system block diagram showing a second embodiment of the data transmission unit according to the present invention.

Next, a description will be given of a second embodiment of the data transmission unit according to the present invention, by referring to FIG. 7. In FIG. 7, those parts which are the same as those corresponding parts in FIG. 4 are designated by the same reference numerals, and a description thereof will be omitted.

This embodiment differs from the first embodiment in that no serial interface circuit 116 is provided and that the CPU 112 is not provided with the relay transmission and reception function by error correction and data compression.

Accordingly, in this second embodiment, the terminals 2a and 2b are coupled directly to the modem 12a from the respective ports 10a and 10b in the online mode.

Figure 8:
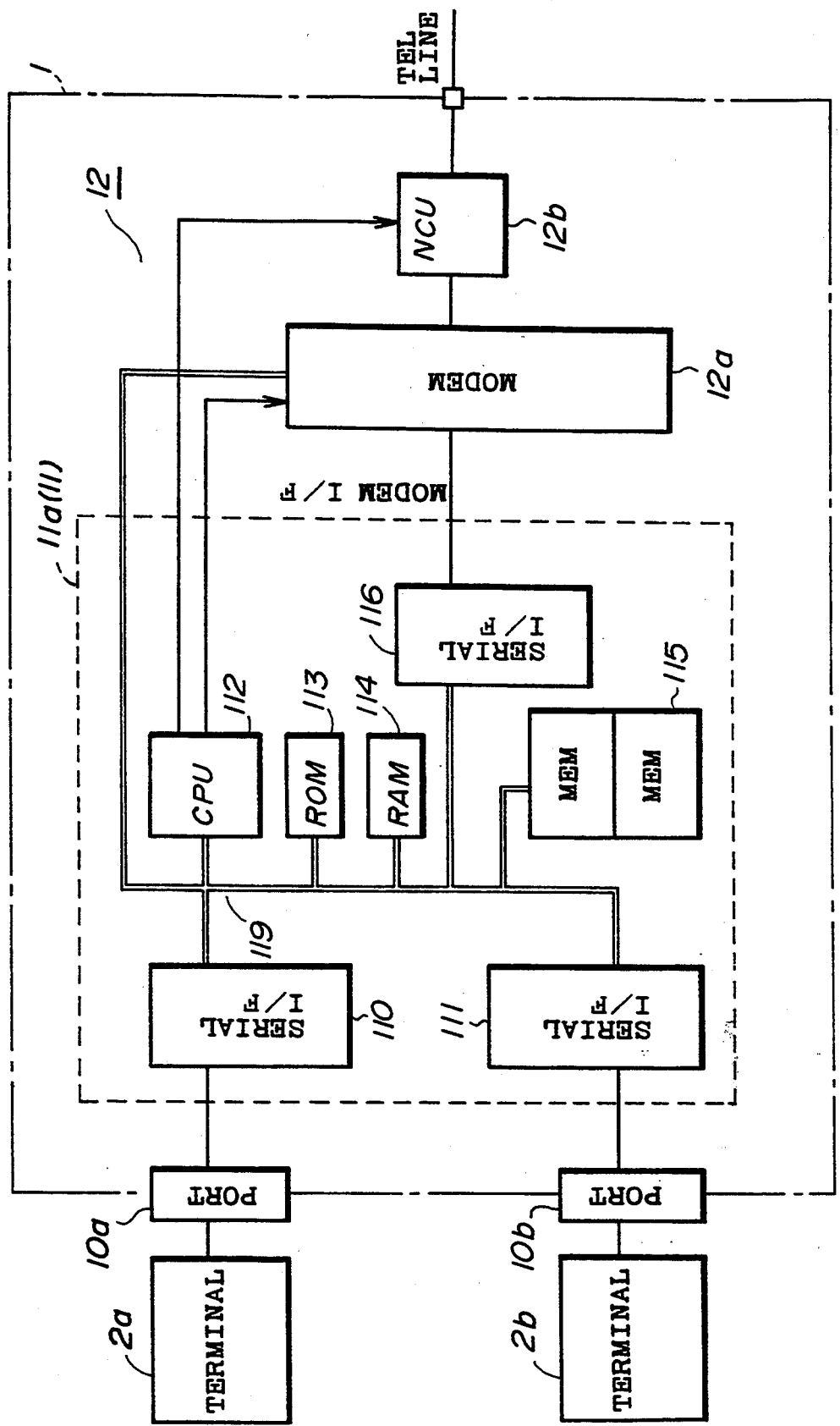
FIG. 8 is a system block diagram showing a third embodiment of the data transmission unit according to the present invention.

Next, a description will be given of a third embodiment of the data transmission unit according to the present invention, by referring to FIG. 8. In FIG. 8, those parts which are the same as those corresponding parts in FIG. 4 are designated by the same reference numerals, and a description thereof will be omitted.

This embodiment differs from the first embodiment in that no switching circuit 11b is provided and that the serial interface circuit 116 is connected directly to the modem 12a. In other words, the control part 11 is made up solely of the modem interface 11a. Furthermore, the mode for each of the ports 10a and 10b and the mode of the modem 12a are preset.

Accordingly, in this third embodiment, the terminals 2a and 2b respectively assume the online mode always via the CPU 112.

The operations of the CPU 112 in the second and third embodiments are basically the same as that shown in FIG. 5, and a description thereof will be omitted.

Figure 9:
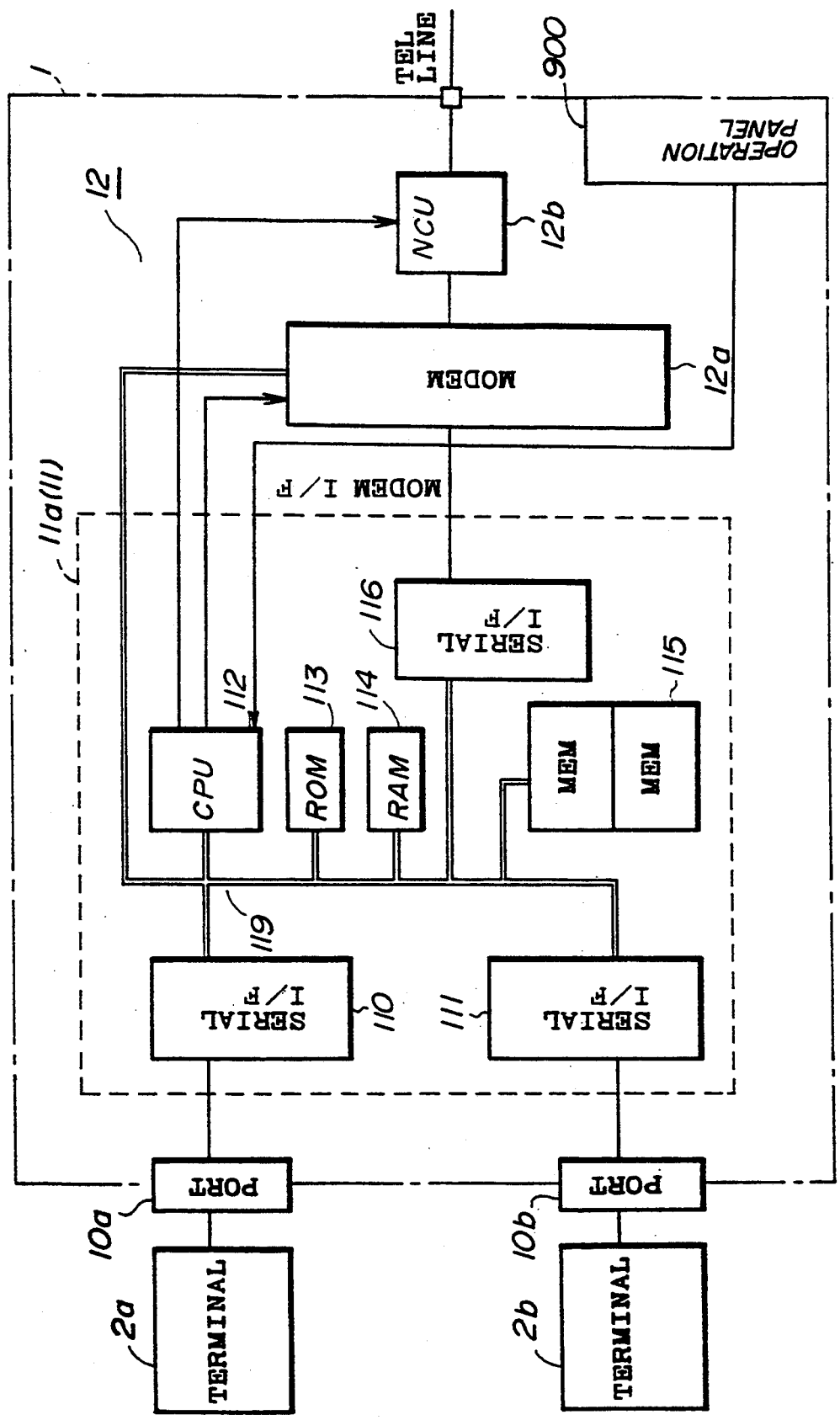
FIG. 9 is a system block diagram showing a fourth embodiment of the data transmission unit according to the present invention.

Next, a description will be given of a fourth embodiment of the data transmission unit according to the present invention, by referring to FIG. 9. In FIG. 9, those parts which are the same as those corresponding parts in FIG. 8 are designated by the same reference numerals, and a description thereof will be omitted.

In this embodiment, the modes of the ports 10a and 10b and the mode of the modem 12a are preset from an operation panel 900 which is provided on the data transmission unit 1, and the preset information from the operation panel 900 are supplied to the CPU 112. The CPU 112 sets the modes of the ports 10a and 10b and the mode of the modem 12a.

FIG. 10 shows an essential part of the operation panel 900. FIG. 10 shows a display part of the operation panel 900 together with selection buttons 900A, 900B and 900C. The selection button 900A is used to select the mode of a port A, a port B or both ports A and B, and one of displays "A" "B", and "A&B" is turned ON when selected. The selection changes from top to bottom every time the selection button 900A is pushed once. The selection is made similarly by the selection buttons 900B and 900C. The selection button 900B is used to select one of full duplex mode with 2400 bps, full duplex mode with 1200 bps, half duplex mode with 4800 bps and half duplex mode with 2400 bps. The selection button 900C is used to select with the synchronous or asynchronous mode for each of the full and half duplex mode selected by the selection button 900B.

In the described embodiments, it was described for the sake of convenience that the terminals 2a and 2b have mutually different modes, namely, the 2-wire full duplex mode and the 2-wire half duplex mode. However, the terminals 2a and 2b may both have the 2-wire full duplex mode or the 2-wire half duplex mode.

In addition, more than two terminals may be connected to the single data communication unit.

Further, the present invention is not limited to these embodiments, but various variations and modifications may be made without departing from the scope of the present invention.

What is claimed is:

1. A data transmission unit comprising:
a plurality of ports, each of said ports being connected to one of a plurality of terminals;
data transmission controller means, connected to a line, for controlling a data transmission; and
control means, coupled between said data transmission controller means and said ports, for establishing a connection for exchanging data between an arbitrary one of the ports and said data transmission controller means by automatically connecting said arbitrary one of the ports to said data transmission controller means via said control means in response to a call out command which is received from one of the terminals via said arbitrary one of the ports,
said control means including means for automatically returning a busy answer to a first terminal coupled to said control means through an arbitrary one of said ports in response to a call out command which is received from the first terminal via one of the ports when the line is in use by a second terminal which is independent of the first terminal and is connected to another one of the ports wherein the coupling established between the first terminal and said control means is maintained even if said line is in use by a second terminal.

2. The data transmission unit as claimed in claim 1, wherein said data transmission controller means has arbitrary modes selected from a group consisting of a full duplex mode and a half duplex mode.

3. The data transmission unit as claimed in claim 2, wherein the terminals use mutually different modes of said data transmission controller means.

4. The data transmission unit as claimed in claim 1, wherein said control means includes a switching circuit which switches and couples one of the ports to said data transmission controller means, and a control part for controlling the switching circuit in response to a call out command so that the port from which the call out command is received is coupled to said data transmission controller means via the switching circuit.

5. The data transmission unit as claimed in claim 1, wherein said control means includes a control part for relaying data between the ports and said data transmission controller means.

6. The data transmission unit as claimed in claim 1, wherein said data transmission controller means includes a modem which is coupled to said control means for modulating data received from the port and for demodulating data received from the line, and a network control unit which is coupled to the line and makes a call out operation and a call in operation.

7. The data transmission unit as claimed in claim 6, wherein said control means includes means for setting a transmission mode of the modem to one of a plurality of transmission modes based on the call out command which is received from one of the terminals.

8. The data transmission unit as claimed in claim 6, which further comprises means for presetting transmission modes of said ports and the modem.

9. The data transmission unit as claimed in claim 1, wherein said control means includes a memory for storing a data transmission control mode of said data transmission controller means for each of the ports, and means for reading the data transmission control mode from the memory and supplying the read data transmission control mode to said data transmission controller means in response to a call out command which is received from one of the terminals via one of the ports, the read data transmission control mode corresponding to the call out command which is received.

10. The data transmission unit as claimed in claim 1, wherein said control means includes a plurality of serial interface circuits coupled to the ports, each of said serial interface circuits being provided with respect to a corresponding one of the ports and converting serial data from the terminal to parallel data, said serial interface circuits being operable independently of each other.

11. A data transmission unit comprising:
a plurality of ports, each of said ports being connected to one of a plurality of terminals;
data transmission controller means, connected to a line, for controlling a data transmission in one of a plurality of set transmission modes that is set; and
control means, coupled between said data transmission controller means and said ports, said control means having,
means for establishing a connection for exchanging data between an arbitrary one of the ports and said data transmission controller means by automatically connecting said arbitrary one of the ports to said data transmission controller means via said control means in response to a call out command received from one of the terminals via said arbitrary one of the ports, and
means for automatically setting the transmission mode of said data transmission controller means in response to the call out command received from said one of the terminals coupled to said control means via said arbitrary one of the ports wherein the coupling established between said one of the terminals and said control means is maintained even if said line is in use by a second terminal.

* * * * *

UNITED STATES PATENT AND TRADEMARK OFFICE
CERTIFICATE OF CORRECTION

PATENT NO. : 5,404,351
DATED : April 4, 1995
INVENTOR(S) : Inoue

It is certified that error appears in the above-indentified patent and that said Letters Patent is hereby corrected as shown below:

Column 4, line 27, delete "CPU." and insert --CPU--.

Column 6, line 19, delete " "A" "B"," and insert --"A", "B"--.

Signed and Sealed this

Fourteenth Day of November, 1995

Attest:

BRUCE LEHMAN

Attesting Officer     Commissioner of Patents and Trademarks